United States Patent [19]

Moser

[11] 4,357,192

[45] Nov. 2, 1982

[54] METHOD FOR APPLYING STICKERS TO PUSH-THROUGH CONTAINERS

[75] Inventor: Theo Moser, Steinenberg, Fed. Rep. of Germany

[73] Assignee: Robert Bosch GmbH, Stuttgart, Fed. Rep. of Germany

[21] Appl. No.: 232,447

[22] Filed: Feb. 6, 1981

[30] Foreign Application Priority Data

Feb. 8, 1980 [DE] Fed. Rep. of Germany ....... 3004637

[51] Int. Cl.[3] ............................................ B32B 31/18

[52] U.S. Cl. .................................... 156/252; 206/528; 206/530; 206/532; 206/534; 428/40; 428/41; 428/42; 428/43; 493/375; 493/961

[58] Field of Search ............... 156/224, 233, 252, 253, 156/265, 300; 493/375, 961; 428/40-43; 206/528, 530, 531, 532, 534, 534.1, 533

[56] References Cited

U.S. PATENT DOCUMENTS

| | | | |
|---|---|---|---|
| 3,780,856 | 12/1973 | Braverman | 206/534 |
| 3,844,408 | 10/1974 | Relyea | 206/534 |
| 3,993,814 | 11/1976 | Cavender | 428/40 |
| 4,295,567 | 10/1981 | Knudsen | 206/534 |

FOREIGN PATENT DOCUMENTS

| | | | |
|---|---|---|---|
| 1024135 | 3/1966 | United Kingdom | 206/534 |

*Primary Examiner*—Caleb Weston
*Attorney, Agent, or Firm*—Edwin E. Greigg

[57] ABSTRACT

A method is proposed providing push-through containers with removable stickers making possible a simple and sure affixing of the stickers to the push-through containers. In addition, this method has the further advantage of making possible the simple and easy removal of the sticker from each container unit separated from the push-through container.

6 Claims, 3 Drawing Figures

METHOD FOR APPLYING STICKERS TO PUSH-THROUGH CONTAINERS

BACKGROUND OF THE INVENTION

Push-through containers are produced with the help of thermal forming machines, in which at first depressions are created by deforming a heated sheet of foil for the purpose of containing tablets or similar objects. After having been filled, the depressions are closed by sealing a cover foil to the sheet of foil having the depressions. Next, the push-through containers are heat stamped and perforated. This perforation makes it possible to take one part of the container, containing one tablet, and to separate it from the entire push-through container. After these processes, the foil sheet passes through a punching station, where the desired sizes of packages are punched out. The push-through containers thus made are generally brought to a packaging machine which packages them singly or in batches in folding boxes.

For some time now the desire has been expressed, especially on the part of hospitals, to equip the push-through containers additionally with stickers in such a way, that every part of the container separated from the whole and containing one tablet or the like carries a sticker. The reason for this can be seen especially in the desire for certainty of control over the dispensed medication. Before the respective tablet container is given to the patient, the nurse removes the sticker from the container and pastes it into a card file. This method makes it possible to ascertain at any future moment the time and amount of medication dispensed. Furthermore, errors in writing or transferring information possible in the past are avoided with certainty by transferring the stickers from the push-through container to the card file. Another advantage, especially in respect to child-proofing the container, arises from the use of the pasted-on sticker, since the tablet can only be pushed out through the cover foil after removal of the sticker.

However, there are some difficulties in affixing the stickers to the cover foil of push-through containers. The stickers cannot be affixed before the perforation of the push-through containers and then be perforated together with them, since in this case the gummed layer of the stickers would adhere to the perforating cutters. To equip each and every part of a push-through container with a sticker, so that no perforation of the stickers is necessary, cannot be considered as a solution to the problem for reasons of efficiency.

A method for the affixing of stickers would be advantageous in which no residue would adhere to the perforating cutters but in which the demand to equip each single push-through container with a separately removable sticker could be satisfied, in which case an efficient affixing of the stickers by machine would be a prerequisite.

OBJECT AND SUMMARY OF THE INVENTION

By means of the method according to the present invention, the main advantage of a sure and simple process for the affixing of stickers to the push-through container is achieved. Because the stickers are sowewhat narrower than the push-through containers, a clear area is created between the affixed stickers and therefore the longitudinal perforation of each push-through container remains clear and is not covered by the sticker. After punching out the several push-through containers it becomes possible, by bending the package in the center, to remove the individual stickers from the depression or the container part, either after separating the individual depression or before pushing the tablet therethrough.

By means of the methods detailed in further subclaims it is possible to create advantageous embodiments and further improvements of the methods according to the present invention or of the push-through container.

The invention will be better understood and further objects and advantages thereof will become more apparent from the ensuing detailed description of preferred embodiments taken in conjunction with the drawing.

DESCRIPTION OF THE PREFERRED EMBODIMENT

Figure 1:
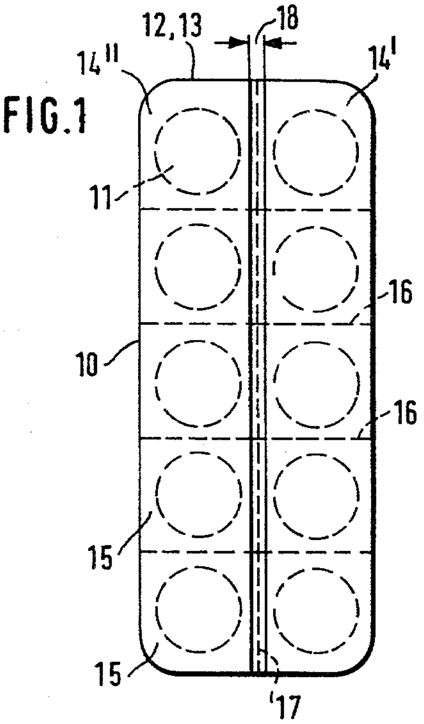
FIG. 1 shows a plan view of a push-through container.
Figure 2:
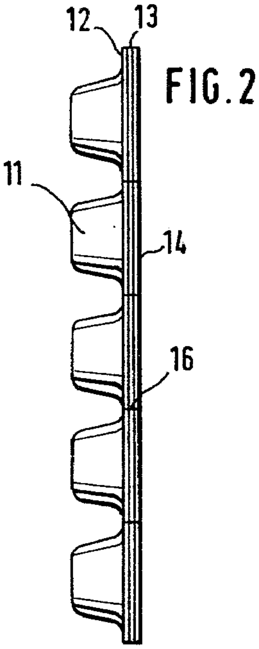
FIG. 2 is a side view of FIG. 1.
Figure 3:
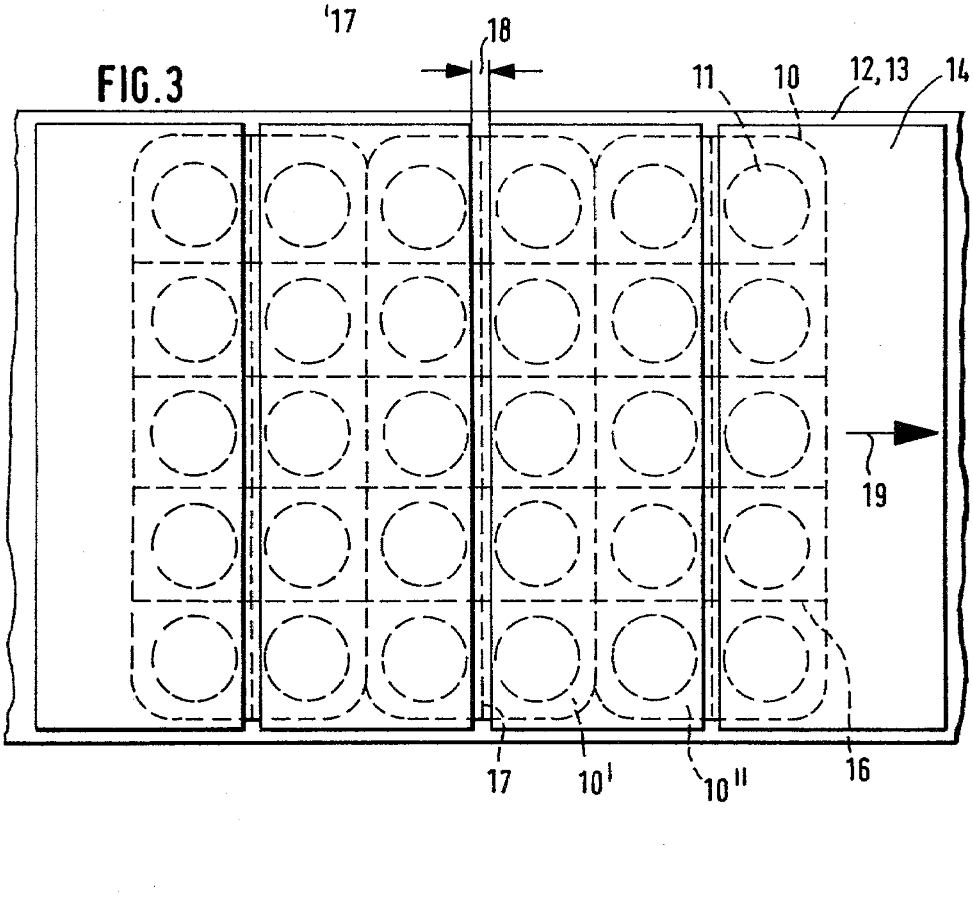
FIG. 3 is a plan view of several push-through containers still in the foil sheet state.

As can be seen from the drawing, the push-through container 10 comprises a lower foil 12 having depressions 11, a cover foil 13 connected by sealing with this lower foil 12 and a sticker 14 connected with the cover foil 13. To facilitate the separation of individual container units 15 from the push-through container 10, the latter has transverse perforations 16 as well as a lengthwise perforation 17. The transverse perforations 16 are in the lower foil 12, the cover foil 13 and the sticker 14. The lengthwise perforation 17, however, is only in the push-through container 10, i.e., in the lower foil 12 and the cover foil 13. By affixing the sticker 14 in accordance with the present invention, as shown in FIG. 3, it becomes possible, as can be seen also from FIG. 1, to avoid covering the lengthwise perforation 17 with the sticker 14 and to achieve a clear area 18. FIG. 3 shows how this clear area 18 is achieved. The stickers 14 are affixed to the push-through containers 10 in the foil sheet transversely to the direction of movement in such a way that a row of tablets in the previous push-through container 10' and a row of tablets in the following push-through container 10'' is covered. The stickers 14 to be affixed are somewhat narrower than the push-through containers, so that the lengthwise perforations 17 remain clear. It should also be mentioned that the stickers 14 have already been provided with the transverse perforations 16 before affixing them to the push-through containers 10. After punching the push-through containers 10 from the foil sheet, the push-through container 10, shown in FIG. 1 is the result, from which container units 15 can be detached with facility, showing a sticker easy to grasp and remove from the container unit 15.

The advantage of this method, in contrast to one where the stickers 14 are affixed to the push-through containers 10 in such a way that both rows of tablets in a push-through container 10 are covered by the sticker, lies expecially if done according to the present invention, in avoiding a later perforation leading to residue deposits on the perforating cutters. It would be advantageous to dispose the known sticker dispenser within the thermal forming machine between the perforations means for the punch-through containers 10 and the puch means. In addition to the advantage of being able to write on the stickers 14 there is the additional advantage that the unauthorized removal of tablets, for instance by children, is made more difficult, since the sticker 14 first has to be removed from the push-through container 10 or the container unit 15 before a tablet can be pushed through the cover foil 13.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. A method of applying a perforated, releasable sheet in a strip form and provided on one side with adhesive substance and on the other side with repetititve indicia arranged to overlay a series of separable preformed pockets in a filled and covered container having a predetermined length and width, the step of applying at least two of said strips, side-by-side, each strip covering two rows of said preformed pockets, said strips being in spaced apart relation whereby a longitudinal area of said covered container is viewable between said strips whereby said releasable sheet may be removed from said covered container and transferred to a record.

2. A method of applying a perforated releasable sheet as claimed in claim 1, the further step of applying said strips to at least two rows of said preformed pockets in adjacently disposed (side by side) containers.

3. A method of applying perforated releasable sheets as defined in claim 1, the further step of perforating each said container and cover therefore, longitudinally and medially thereof prior to application of said releasable sheet, applying said releasable sheet to said adjacently disposed containers whereby said longitudinal perforations in each said container is viewable therebetween.

4. A method of applying perforated releasable sheets as defined in claim 1, the further step of applying transversely extending spaced rows of perforations to said releasable sheets before securement thereof to said containers.

5. A method of applying perforated releasable sheets as defined in claim 1, the further step wherein each strip has a width of less than one-half of said width of said container.

6. A method of applying a perforated releasable sheet as claimed in claim 3, the further step of applying transversely extending spaced rows of perforations to said releasable sheets before securement thereof to said containers.

* * * * *